United States Patent
Aeppli et al.

(10) Patent No.: US 9,309,712 B2
(45) Date of Patent: Apr. 12, 2016

(54) DRIVE APPARATUS FOR REVOLVING DOOR ROTOR

(75) Inventors: Heinz-Peter Aeppli, Wildberg (CH); Kari Oila, Zürich (CH)

(73) Assignee: AGTATEC AG, Fehraltorf (CH)

( * ) Notice: Subject to any disclaimer, the term of this patent is extended or adjusted under 35 U.S.C. 154(b) by 0 days.

(21) Appl. No.: 14/360,426

(22) PCT Filed: Aug. 22, 2012

(86) PCT No.: PCT/EP2012/003555
§ 371 (c)(1),
(2), (4) Date: May 23, 2014

(87) PCT Pub. No.: WO2013/075761
PCT Pub. Date: May 30, 2013

(65) Prior Publication Data
US 2014/0290139 A1    Oct. 2, 2014

(30) Foreign Application Priority Data
Nov. 24, 2011 (DE) .......................... 10 2011 119 416

(51) Int. Cl.
*E05F 1/10* (2006.01)
*E05F 15/10* (2006.01)
(Continued)

(52) U.S. Cl.
CPC ............. *E05F 15/106* (2013.01); *E05F 15/608* (2015.01); *F16H 7/023* (2013.01); *F16H 7/12* (2013.01); *E05Y 2201/488* (2013.01); *E05Y 2201/652* (2013.01); *E05Y 2201/668* (2013.01); *E05Y 2201/672* (2013.01); *E05Y 2600/13* (2013.01); *E05Y 2600/312* (2013.01); *E05Y 2800/21* (2013.01)

(58) Field of Classification Search
USPC .................. 49/42, 43; 474/148, 151, 152, 153
IPC ............ E05F 15/106,15/608; F16H 7/12, 7/023
See application file for complete search history.

(56) References Cited

U.S. PATENT DOCUMENTS 2,185,079 A * 12/1939 Hall ................................. 474/87
2,753,812 A *  7/1956 Wharton ........................ 105/105
(Continued)

FOREIGN PATENT DOCUMENTS

| DE | 43 44 204 | 1/1995 |
| DE | 197 34 400 | 2/1999 |

(Continued)

OTHER PUBLICATIONS

International Search Report for PCT/EP2012/003555, mailed Oct. 12, 2012.
(Continued)

*Primary Examiner* — Gregory Strimbu
(74) *Attorney, Agent, or Firm* — Nixon & Vanderhye P.C.

(57) ABSTRACT

A drive apparatus for a rotor of a revolving door, wherein the drive apparatus includes a drive device, which is motion-coupled to the rotor via a drive belt. The drive apparatus further includes a tensioning device for tensioning and deflecting the drive belt, wherein the drive belt connects the drive device, the tensioning device and the rotor. The tensioning device and/or the drive device are mounted with a variable distance between one another, so that an extension of the drive belt caused by acceleration or deceleration of the rotor is compensated by varying the distance between the tensioning device and the drive device.

8 Claims, 3 Drawing Sheets

Figure 1:
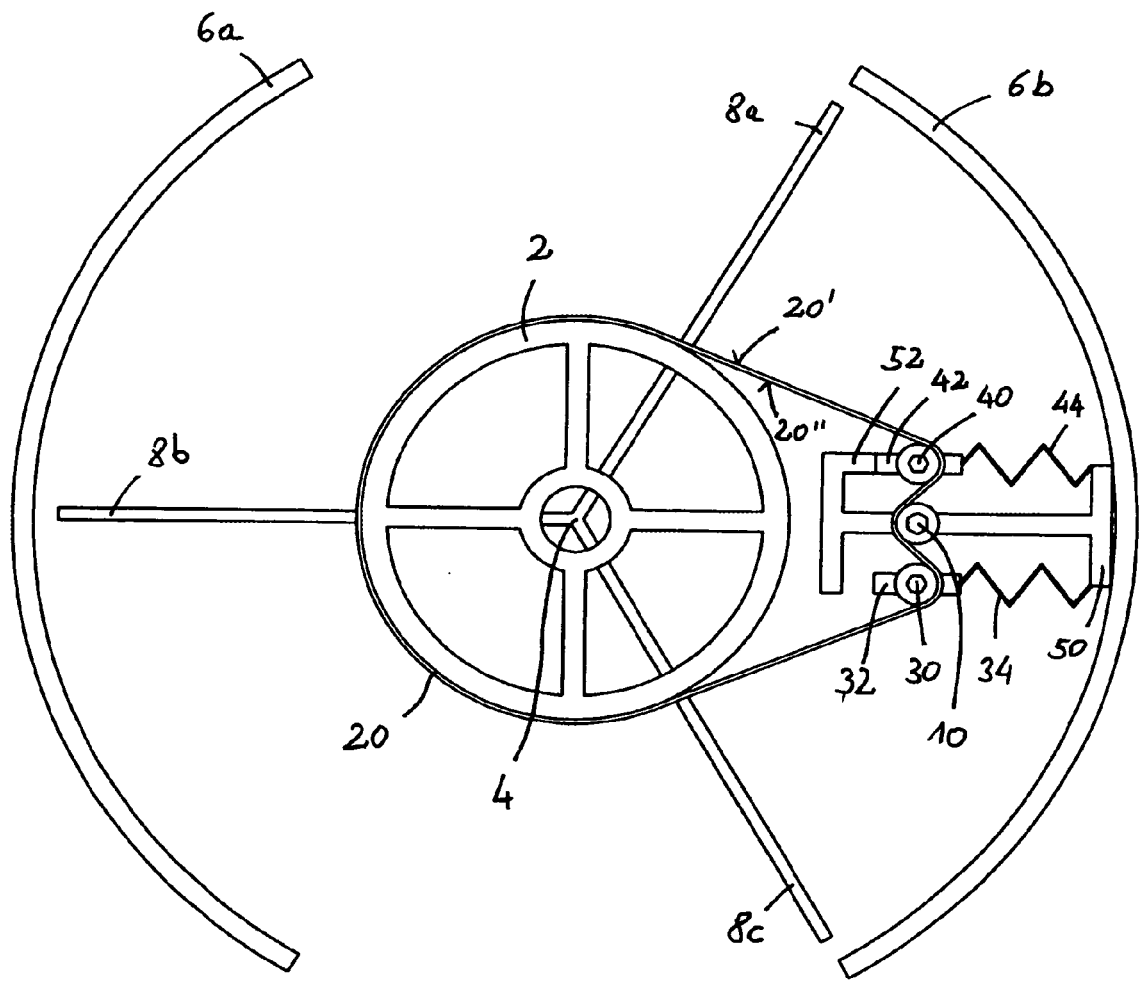

(51) Int. Cl.
*F16H 7/02* (2006.01)
*F16H 7/12* (2006.01)
*E05F 15/608* (2015.01)

(56) References Cited

U.S. PATENT DOCUMENTS 2,775,130 A * 12/1956 Stephan .................. 474/134
3,892,140 A * 7/1975 Fox et al. ................ 474/121
4,154,023 A * 5/1979 Carroll ...................... 49/32
4,781,015 A * 11/1988 Dinkelmann et al. ...... 57/105
5,749,800 A * 5/1998 Nagel et al. ............... 474/84
2003/0089042 A1 5/2003 Oberheide et al.
2007/0219031 A1* 9/2007 Jones ...................... 474/148

FOREIGN PATENT DOCUMENTS

DE 20 2005 00016 2/2006
EP 0 165 443 12/1985

OTHER PUBLICATIONS

Written Opinion of the ISA for PCT/EP2012/003555, mailed Oct. 12, 2012.

* cited by examiner

DRIVE APPARATUS FOR REVOLVING DOOR ROTOR

This application is the U.S. national phase of International Application No. PCT/EP2012/003555 filed 22 Aug. 2012 which designated the U.S. and claims priority to German Patent Application No. 10 2011 119 416.2 filed 24 Nov. 2011, the entire contents of each of which are hereby incorporated by reference.

The present invention relates to a drive device for a rotor of a revolving door in accordance with the preamble of Claim 1, and to a revolving door equipped with this drive device.

Revolving doors are used in particular as imposing, eye-catching solutions for an entryway to a building. Such revolving doors may be installed outside or inside a frontage wall or in the centre of a wall.

A revolving door usually has arcuately curved side walls, between which a rotor centrally revolves. Starting from a central rotor axis, which is also referred to as a centre axis of the rotor, for example two, three or more rotor wings which are offset relative to each other at identical angular distances in the circumferential direction are arranged extending in the radial direction.

Revolving doors can be driven by a drive motor which is configured in particular as an electric motor. The drive motor in this case is usually coupled in terms of movement to the rotor of the revolving door via a gear means which may be configured, for example, as a worm gear, a drive belt and a belt pulley, the belt pulley being connected to the rotor in a rotationally secure manner.

Drive devices for a rotor of a revolving door, in which a force transmission from a drive wheel to the belt pulley takes place by means of a toothed drive belt, are known from the prior art. In a corresponding embodiment of the drive device, both the drive wheel and the belt pulley then also have to be toothed. However, the costs of a toothed belt pulley are very high.

In order to reduce the costs of a drive device, it is possible to use a non-toothed belt pulley which is driven by means of a non-toothed drive belt by a drive wheel. In this instance, the force is transmitted to the non-toothed belt pulley by the drive belt by means of cable friction. The drive belt conventionally consists of an expansible material. When the revolving door is accelerated or braked by means of the drive motor, the tension side of the drive belt which is formed during acceleration of the revolving door in the incoming region and during the braking of the revolving door in the outgoing region between the belt pulley and the drive wheel, is expanded. Owing to the expansion of the drive belt, the cable friction between the drive belt and the belt pulley and between the drive belt and the drive wheel is reduced. Consequently, with a corresponding conventional drive device, the drive belt must be very highly pretensioned so that, in any operating state, the pretensioning force is always greater than the maximum drive force so that the cable friction between the drive belt and the belt pulley is maintained. Owing to the high pretensioning of the drive belt, the bearings of the drive wheel and the belt pulley are highly loaded and subjected to a high level of wear.

A generic revolving door is known, for example, from DE 20 2005 000 163 U1. In this case, the revolving door is a hand-operated revolving door comprising a drive device for a rotor. In this context, the drive device further comprises a drive belt, the drive motor being coupled in terms of movement to the rotor of the revolving door by means of the drive belt.

EP 0 165 443 A1 discloses a door drive comprising an anti-catching safety device for doors of lift cars. In this door drive, the lift car doors are driven by means of a motor and by means of a drive belt. Here, the door drive further comprises a reversing switching device, by means of which the drive apparatus of the lift car door can be reversed if, for example, there is an object in the region covered by the lift car doors. The reversing switching device additionally comprises a sprocket, which is coupled in terms of movement to the drive belt, and two redirection rollers, which are likewise coupled in terms of movement to the sprocket by means of a toothed belt. The toothed belt is clamped by means of clamping rollers, the clamping rollers being pivotally connected to the sprocket by an actuation lever. Here, the clamping roller and the sprocket are pivotally connected by a stop lever. Furthermore, the clamping rollers are interconnected by means of a spring. Depending on the drive apparatus of the lift car door, the toothed belt is clamped by means of the clamping rollers and indirectly by means of the spring.

Finally, a drive device for the automatic operation of a closing system for a motor vehicle is known from US 2003/089042 A1. This drive device comprises various elements, such as a drive belt, a driving pinion, a motor output shaft etc. In this case, the drive belt is guided circumferentially around a roller and around two redirection rollers, the two redirection rollers being supported so as to be variable in terms of spacing by means of rollers fitted with a spring and by means of a clamping device.

By contrast, an object of the present invention is to provide an improved drive device for a rotor of a revolving door, which is designed to be more cost-effective and to have a longer life than known drive devices.

This object of the present invention is achieved in terms of the drive device for a rotor of a revolving door according to certain features described in this disclosure and in terms of the revolving door according to certain features described in this disclosure. Advantageous embodiments are also set out in various aspects of this closure.

Owing to the compensation for the expansion of the drive belt by the change in spacing of the clamping apparatus with respect to the drive apparatus, that is to say, by means of extension of the path which is intended to be travelled by the drive belt, the cable friction between the drive belt and the belt pulley necessary for reliable driving, that is to say, for reliable acceleration and for much more important, reliable braking of the revolving door is maintained. Consequently, the pretensioning force for the drive belt can be reduced so that both the drive belt and the bearings of the drive wheel and the belt pulley are subjected to less loading.

Preferably, the clamping apparatus is supported with respect to the drive apparatus so as to be able to be varied in terms of spacing in such a manner that an expansion of the drive belt in the event of an acceleration or braking of the rotor is compensated for by means of a position change of the clamping apparatus.

Alternatively, it is also possible for the drive apparatus to be supported with respect to the clamping apparatus so as to be able to be varied in terms of spacing in such a manner that an expansion of the drive belt in the event of an acceleration or braking of the rotor is compensated for by means of a position change of the drive apparatus. When the position of the drive apparatus is changed, the spacing between the drive device and a centre axis of the rotor can be changed by means of corresponding movement of the drive device in the direction towards or away from the centre axis. In addition, the position of the drive apparatus can be changed in a movement direction perpendicular thereto.

The change in spacing of the clamping apparatus with respect to the drive apparatus may, for example, be produced by the clamping apparatus and/or the drive apparatus being moved in a motorised manner in accordance with an acceleration or braking operation.

Preferably, the change in spacing of the clamping apparatus with respect to the drive apparatus is carried out by the clamping apparatus being resiliently supported by means of at least one force storage apparatus which may comprise a tension spring apparatus or a pressure spring apparatus, and/or the drive apparatus being resiliently supported by means of another force storage apparatus which may comprise a tension spring apparatus or a pressure spring apparatus, with respect to a retention apparatus which cannot be changed in terms of spacing with respect to a centre axis of the rotor. In this instance, the respective force storage apparatuses may also be produced as helical spring apparatuses, as pneumatic spring apparatuses or generally as pneumatic cylinder apparatuses having any compressible fluid.

This solution for changing spacing is particularly simple and cost-effective since no active position change of the clamping apparatus and/or the drive apparatus is required. Since, in accordance with the force relationships in the event of an acceleration of the rotor, in the event of a constant velocity or idle state of the rotor, or in the event of braking of the rotor, the clamping apparatus and/or the drive apparatus is moved towards the centre axis of the rotor or away from it so that the circumferential length of the drive belt is automatically adapted to the expansion of the drive belt.

In general terms and regardless of whether the force storage apparatus is produced as a tension spring apparatus or pressure spring apparatus, in the event of an acceleration of the revolving-door rotor by the drive apparatus, the input redirection roller follows the resilient force of the first force storage apparatus. At the same time, in the event of an acceleration of the revolving-door rotor by the drive apparatus, the output redirection roller moves counter to the resilient force of the second force storage device. In the event of braking of the revolving-door rotor by the drive apparatus, the input redirection roller follows the resilient force of the first force storage apparatus and the output redirection roller moves counter to the resilient force of the second force storage apparatus.

The clamping apparatus may preferably comprise an input redirection roller and an output redirection roller. The input redirection roller is arranged at the input side of the drive apparatus so that the drive belt which runs towards the drive apparatus is first redirected via the input redirection roller and is then driven by the drive apparatus. The output redirection roller is arranged at the output side of the drive apparatus so that the drive belt which is driven by the drive apparatus and which runs away from it is redirected by means of the output redirection roller. In this instance, the input redirection roller and/or the output redirection roller is/are supported so as to be variable in terms of spacing with respect to the centre axis of the rotor.

Owing to a corresponding embodiment of the clamping apparatus, it is possible for a first side of the drive belt to be in contact with the drive apparatus, whereas the other side of the drive belt is in contact with the clamping apparatus and with the belt pulley. Consequently, the first and second sides of the drive belt may have different properties. The first side of the drive belt may be constructed in such a manner that a good transmission of force from the drive apparatus to the drive belt is ensured. This can be enabled, for example, by the drive device comprising a gear and the drive belt being constructed as a toothed belt, only the first side of the drive belt having to be toothed in this instance. The second side of the drive belt may be constructed in such a manner that a great static and sliding friction is produced between the drive belt and the belt pulley. This may be produced, for example, by the drive belt having at least a second rubber-coated side. In this instance, the transmission of force from the drive apparatus to the belt pulley is carried out by means of the cable friction principle. The belt pulley does not have to be toothed so that the costs of a corresponding drive device are reduced.

Preferably, the input redirection roller is supported by means of a first force storage apparatus so as to be variable in terms of spacing and/or positionally variable relative to the centre axis of the rotor. In this instance, the first force storage apparatus is secured to a retention apparatus which is non-variable in terms of spacing relative to the centre axis of the rotor. Furthermore, the output redirection roller is preferably supported by means of a second force storage apparatus so as to be variable in terms of spacing and/or positionally variable relative to the centre axis of the rotor, the second force storage apparatus also being secured to the retention device. In this instance, the drive apparatus is supported so as to be non-variable in terms of spacing relative to the centre axis of the rotor. Both the first force storage apparatus and the second force storage apparatus may each comprise a tension spring apparatus or a pressure spring apparatus. The circumferential path of the drive belt is thus W-shaped, the two free members of the W being directed towards the belt pulley.

The drive belt is consequently pretensioned via the input redirection roller and the output redirection roller so that a possible constant cable friction in each operating state of the drive device (acceleration, constant speed/idle state, braking of the rotor) is ensured since an expansion of the drive belt when the rotor is accelerated or braked is compensated for.

This is because, when the rotor is accelerated by the drive apparatus, the tension side of the drive belt is expanded. At the same time, when the first force storage apparatus is constructed as a tension spring apparatus, it is also expanded. However, when the first force storage apparatus is constructed as a pressure spring apparatus, it is compressed by the drive apparatus in the event of an acceleration of the rotor. Consequently, in the event of an acceleration of the rotor by the drive apparatus, a spacing of the input redirection roller with respect to the centre axis of the rotor is reduced. At the same time as the spacing of the input redirection roller is reduced with respect to the centre axis of the rotor, the associated expansion of the drive belt is compensated for by means of an increase of the spacing of the output redirection roller with respect to the centre axis of the rotor. This increase of the spacing of the output redirection roller with respect to the centre axis of the rotor is produced by the second force storage apparatus being compressed when it is constructed as a tension spring apparatus. However, when the second force storage apparatus is constructed as a pressure spring apparatus, it is expanded by the drive apparatus in the event of an acceleration of the rotor. Owing to this kinematic property of the input redirection roller and the output redirection roller, consequently, the cable friction required to drive the rotor is maintained between the drive belt and the belt pulley.

Preferably, the drive device further comprises a stop, which limits the spacing of the output redirection roller with respect to the centre axis of the rotor to a minimum spacing so that the spacing of the output redirection roller in any operating state of the drive device is always greater than or equal to the minimum spacing. When the rotor is braked by the drive apparatus, the spacing of the output redirection roller with respect to the centre axis of the rotor is consequently only reduced as far as the minimum spacing.

Owing to the limitation of the reduction of the spacing of the output redirection roller with respect to the centre axis of the rotor, the output redirection roller is prevented from being moved towards the centre axis of the rotor (beyond a specific dimension) so that, when a second resilient apparatus is constructed as a tension spring apparatus, this also cannot expand. This ensures the shortest possible stopping distance of the revolving door rotor since the output redirection roller does not first have to be pulled in the direction of the centre axis of the rotor over a specific distance before the maximum braking torque can be transmitted to the belt pulley. The expansion of the tension side of the drive bar which is formed when the revolving-door rotor is braked by the drive apparatus in the outgoing region between the output redirection roller and the belt pulley, is compensated for in this instance by means of an increase of the spacing of the input redirection roller with respect to the centre axis of the rotor.

Figure 2:
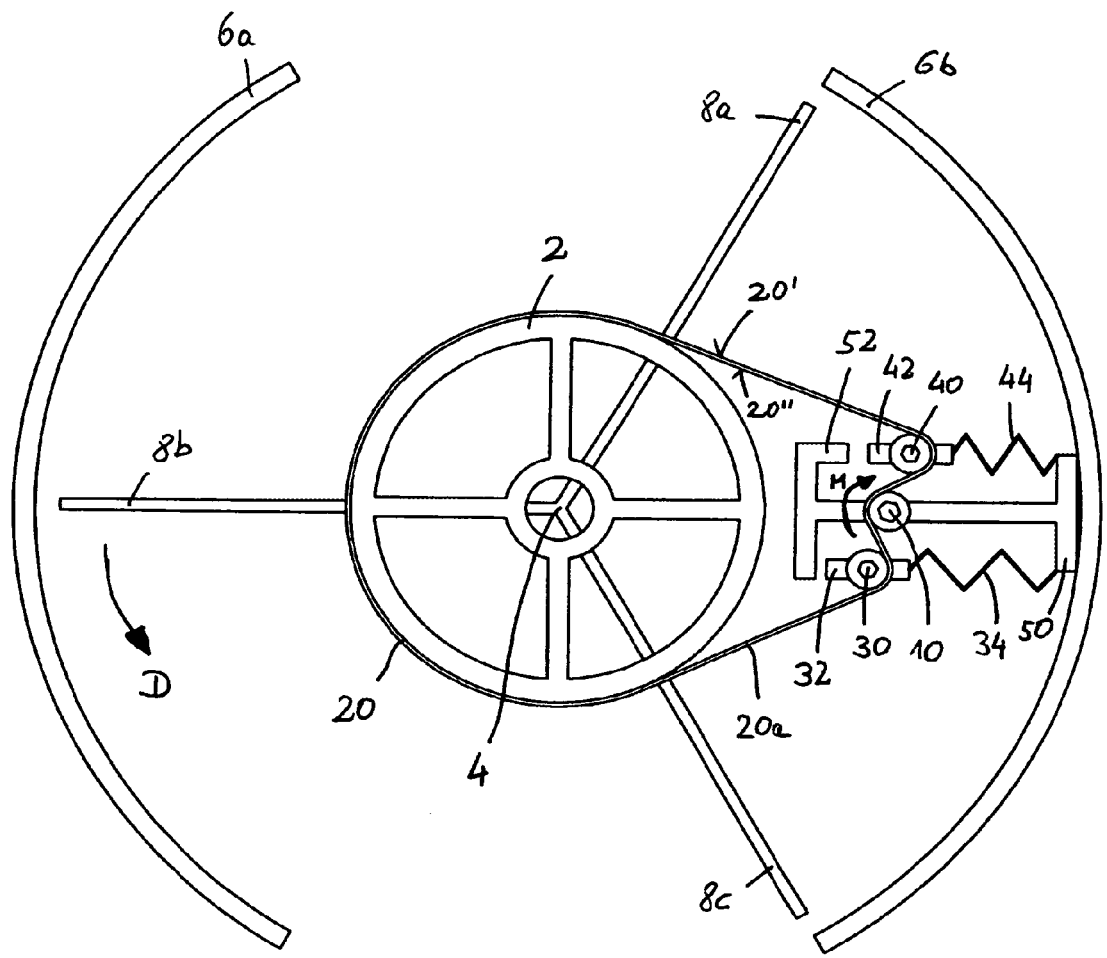
Figure 3:
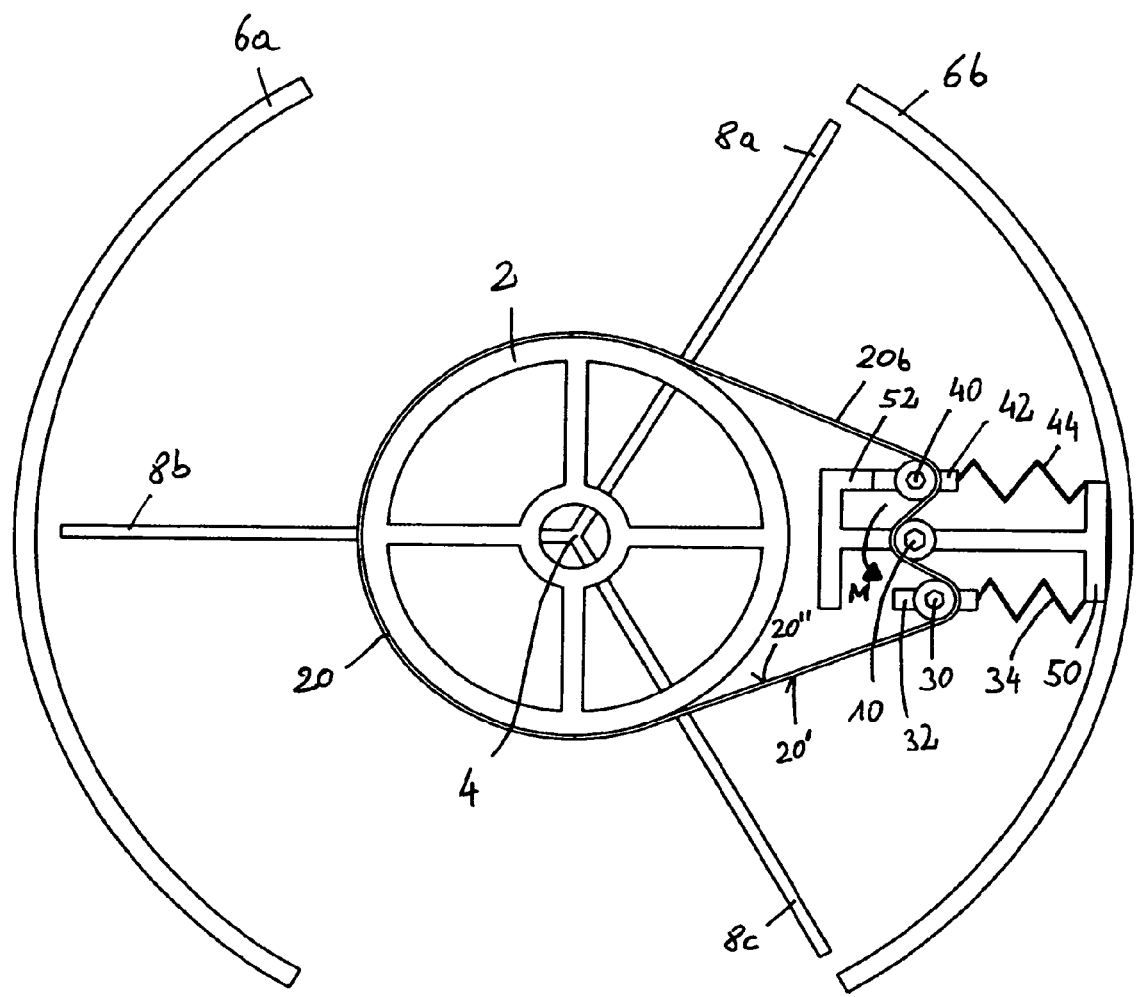

The invention is explained in greater detail below with reference to embodiments. In the drawings:

FIG. 1: is a schematic plan view of a drive device according to the invention which is coupled in terms of movement to a belt pulley of a revolving-door rotor, the drive device being illustrated in a state in which the revolving-door rotor either is not driven or is driven at a constant speed;

FIG. 2: shows the drive device illustrated in FIG. 1 in a state of acceleration of the revolving-door rotor; and FIG. 3: shows the drive device illustrated in FIG. 1 in a state of braking of the revolving-door rotor.

In the description which now follows, identical reference numerals designate identical components or identical features so that a description given in relation to one Figure with respect to one component also applies to the other Figures so that repetition of the description is avoided.

FIG. 1 is a schematic plan view of a revolving door together with the drive device according to the invention. The revolving door comprises two arcuately curved side walls 6a, 6b and between the end regions of which an entrance region and an exit region are formed. There is further arranged centrally between the side walls 6a, 6b a rotor which is rotatably supported about a centre axis 4. From the central centre axis 4, three rotor wings 8a, 8b, 8c which are offset relative to each other in the circumferential direction are arranged extending in the radial direction. The rotor is connected for conjoint rotation to a belt pulley 2 which is also referred to as a rotor drive, the rotation axis 4 of the rotor coinciding with the rotation axis of the belt pulley 2.

The drive device illustrated in FIG. 1 for driving, that is to say, for accelerating and braking the revolving-door rotor, comprises a drive apparatus 10 in the form of a toothed drive wheel 10, which is also referred to as a drive gear or a drive pulley, the tooth arrangement of the drive wheel 10 not being illustrated. Furthermore, the drive device comprises a drive belt 20 which has a toothed side 20' and a non-toothed side 20", the toothed side 20' being in engagement with the toothed drive wheel 10, and the non-toothed side 20" being in abutment with the belt pulley 2.

The drive device further comprises a clamping apparatus having an input redirection roller 30 and an output redirection roller 40. The input redirection roller 30 is arranged at the input side of the drive wheel 10. That is to say, that the drive belt 20, which runs from the belt pulley 2 towards the drive wheel 2, is first redirected by the input redirection roller 30 in the direction of the drive wheel 10 and is then driven by the drive wheel 10. The output redirection roller 40 is arranged at the output side of the drive wheel 10. This in turn means that the drive belt 20 which is driven by the drive wheel 10 and which runs away therefrom is redirected by the output redirection roller 40 in the direction of the belt pulley 2. The portion of the circumferential path of the drive belt 2 around the input redirection roller 30, the drive wheel 10 and the output redirection roller 40 is consequently W-shaped, the drive wheel 10 being arranged between the input redirection roller 30 and the output redirection roller 40, and the two free members of the W being orientated towards the belt pulley 2.

Both the input redirection roller 30 and the output redirection roller 40 are not toothed. Owing to the guiding of the drive belt 20 described above, the non-toothed side 20" of the drive belt 20 is in contact with the belt pulley 2, the input redirection roller 30 and the output redirection roller 40, whereas the toothed side 20' of the drive belt 20 is in engagement with the toothed drive wheel 10. Consequently, the drive wheel 10 is coupled to the belt pulley 2 in terms of movement by means of the input redirection roller 30, the output redirection roller 40 and the toothed belt 20.

The respective rotation axes of the input redirection roller 30, the drive wheel 10 and the output redirection roller 40 are each oriented parallel with the rotor centre axis 4.

The input redirection roller 30 is rotatably supported on a first sliding member 32 and the output redirection roller 40 is rotatably supported on a second sliding member 42, respectively. In place of the first and second sliding members, however, first and second levers could also be provided, on which the input redirection roller 30 and the output redirection roller 40 are rotatably supported.

The first sliding member 32 and the second sliding member 42 are supported so as to be variable in terms of spacing relative to the belt pulley 2 and the centre axis 4 of the rotor in such a manner that the first sliding member 32 and the second sliding member 42 can move towards and away from the belt pulley 2 and the rotor centre axis 4. In the embodiment illustrated in FIGS. 1 to 3, the sliding members 32 and 42 are supported in such a manner that, in the event of a change of position, they do not move directly towards the rotor centre axis 4 or away from it, but instead the first and second sliding members 32, 42 can each be moved towards or away from locations beside the rotor centre axis.

The drive device illustrated in FIGS. 1 to 3 further comprises a retention apparatus 50. The retention apparatus 50 is secured to a stator, that is to say, to the non-rotatable portion of the door assembly, and extends in the direction of the rotor centre axis 4 and the belt pulley 2. The drive wheel 10 is rotatably connected to the retention apparatus 50. Furthermore, the first sliding member 32 is connected to the retention apparatus 50 by means of a first force storage apparatus 34 and the second sliding member 42 is connected to the retention apparatus 50 by means of a second force storage apparatus 44. In this instance, both the first force storage apparatus 34 and the second force storage apparatus 44 are constructed as a tension spring apparatus.

The first tension spring apparatus 34 pulls the first sliding member 32 together with the input redirection roller 30 and the second tension spring apparatus 44 pulls the second sliding member 42 together with the output redirection roller 40 towards the side wall 6b and consequently away from the rotor centre axis 4, the drive belt 20 loading both the input redirection roller 30 and the output redirection roller 40 in terms of pressure towards the rotor centre axis 4. Consequently, the first resilient apparatus 34 and the second resilient apparatus 44 retain the drive belt 20 under mechanical tensile stress so that the drive belt 20 is tensioned both around the belt pulley 2 and around the drive wheel 10.

Alternatively, however, the first resilient apparatus 34 and/or the second resilient apparatus 44 may also each be constructed as a pressure spring apparatus. In a corresponding embodiment of the drive device (not illustrated), the first pressure spring apparatus would be arranged between the belt pulley 2 and the input redirection roller 30 and the second pressure spring apparatus would be arranged between the belt pulley 2 and the output redirection apparatus 40.

The drive belt 20 may, for example, comprise a (fibre-reinforced) rubber mixture or the non-toothed side 20" of the drive belt 20 may have a coating which increases bonding and sliding friction, such as, for example, a rubber coating, so that a good transmission of force from the drive belt 20 to the rotor drive 2 is achieved.

The drive device illustrated further comprises a stop 52 which limits the spacing of the output redirection roller 40 with respect to the rotor centre axis 4 to a minimum value. In the embodiment illustrated, the stop 52 is an integrated component of the retention apparatus 50. However, the stop 52 may also be secured only to the retention apparatus 50 or be formed as a separate component, which is secured to the revolving door so as not to be variable in terms of spacing relative to the rotor centre axis 4.

In FIG. 1, the drive device is illustrated in a state, in which the revolving-door rotor is not driven by the drive wheel 10 and is consequently stationary. In this state, the spacing of the input redirection roller 30 with respect to the rotor centre axis 4 is equal to the spacing of the output redirection roller 40 with respect to the rotor centre axis 4 since, in the embodiment illustrated, the first resilient apparatus 34 has the same properties as the second resilient apparatus 44 so that the first resilient apparatus 34 applies the same force to the first sliding member 32 and consequently to the input redirection roller 30 as the second resilient apparatus 44 to the second sliding member 42 and consequently to the output redirection roller 40. Furthermore, the second sliding member 42 is in abutment with the stop 52 so that the spacing of the output redirection roller 40 with respect to the belt pulley 2 and the rotor centre axis 4 cannot be reduced further.

FIG. 2 illustrates the drive device illustrated in FIG. 1 in a state in which a torque M is applied to the drive wheel 10 so that the drive wheel 10 drives or accelerates the revolving-door rotor so that the revolving-door rotor rotates in the rotation direction D of the arrow illustrated in FIG. 2. Both the tension side 20a (e.g., the free portion of the drive belt 20 that is not between the belt pulley 2 and the input redirection roller 30) and the first resilient apparatus 34 are thereby expanded. Owing to the expansion of the first resilient apparatus 34, the input redirection roller 30 is moved towards the belt pulley 2 and towards the rotor centre axis 4.

This expansion of the tension side and the first resilient apparatus 34 is compensated for by the second resilient apparatus 44 pulling the second sliding member 42 together with the output redirection roller 40 towards the side wall 6b and consequently away from the belt pulley 2 and the rotor centre axis 4 since a smaller counter-force than in the idle state of the revolving-door rotor acts counter to the second tension spring device 44 owing to the drive belt 20. Owing to this compensation for the expansion of the tension side and the first tension spring apparatus 34 by the second tension spring apparatus 44, the cable friction required for reliably driving the revolving-door rotor is maintained between the drive belt 20 and the belt pulley 2.

FIG. 3 shows the drive device illustrated in FIG. 1 in a state in which a torque M directed counter to the rotation direction D is applied to the drive wheel 10 so that the drive wheel 10 brakes the revolving-door rotor. Both the tension side 20b, that is to say, the free portion of the drive belt 20 that is not in abutment between the belt pulley 2 and the output redirection roller 40 and the second resilient apparatus 44 are thereby expanded. Owing to the expansion of the second resilient apparatus 44, the output redirection roller 40 is moved towards the belt pulley 2 and towards the rotor centre axis 4, but with the movement of the second sliding member 42 together with the output redirection roller 40 towards the rotor centre axis 4 being limited by the stop 52.

The stop 52 consequently prevents an (excessive) expansion of the second tension spring apparatus 44 so that, in the event of braking of the revolving-door rotor (for example, a safety stop), the output redirection roller 40 has to travel no distance or only a short distance before the braking force can be transmitted by the drive belt 20 to the belt pulley 2. The shortest possible stopping distance of the revolving-door rotor is thereby achieved.

The expansion of the tension side and optionally the expansion of the second resilient apparatus 44 is compensated for by the first resilient apparatus 34 pulling the first sliding member 32 together with the input redirection roller 30 towards the side wall 6b and consequently away from the belt pulley 2 and from the rotor centre axis 4 since a smaller counter-force than in the idle state of the revolving-door rotor acts counter to the first tension spring apparatus 34 owing to the drive belt 20. Owing to this compensation for the expansion of the tension side and optionally the expansion of the second tension spring apparatus 44 by the first tension spring apparatus 34, the necessary cable friction for reliably braking the revolving-door rotor is maintained between the drive belt 20 and the belt pulley 2.

Owing to the drive device according to the invention, not only is an expansion of the drive belt 20 owing to driving or braking compensated for by the drive wheel 10, but so is an expansion of the drive belt 20 in the event of a manual application of force via one of the rotor wings 8a, 8b, 8c so that the cable friction required for reliable driving and/or braking of the revolving-rotor door is always maintained between the drive belt 20 and the belt pulley 2.

LIST OF REFERENCE NUMERALS

2 Belt pulley, rotor drive
4 Centre axis of the rotor
6a, 6b Side wall (of the revolving door)
8a, 8b, 8c Wing (of the rotor)
10 Drive apparatus, drive wheel
20 Drive belt
20a, 20b Tension side (of the drive belt)
20' Toothed side of the drive belt
20" Non-toothed side of the drive belt
30 Input redirection roller
32 Sliding member (of the input redirection roller)
34 First force storage device
40 Output redirection roller
42 Slotted member (of the output redirection roller)
44 Second force storage apparatus
50 Retention apparatus
52 Stop
D Rotation direction (of the revolving-door rotor)
M Torque (on the drive device)

The invention claimed is:

1. A revolving door comprising:
a rotor comprising at least two wings and a belt pulley, wherein the rotor is configured to rotate about a central axis of the rotor, and wherein the at least two wings extend in a radial direction from the central axis of the rotor; and
a drive device comprising:
a drive apparatus and a drive belt;

wherein:
the drive apparatus is coupled to the rotor by the drive belt, such that the rotor rotates about the central axis as the drive belt moves;
the drive device further comprises a clamping apparatus for clamping and redirecting the drive belt;
the drive belt operatively engages the drive apparatus and the clamping apparatus;
the clamping apparatus and the drive apparatus being configured to move relative to each other such that an expansion of the drive belt in an event of acceleration or braking of the rotor by the drive apparatus is compensated for by a change in a distance between the clamping apparatus and the drive apparatus;
the drive belt comprises a toothed side and a non-toothed side;
the drive apparatus comprises a toothed drive wheel which is in engagement with the toothed side of the drive belt;
the non-toothed side of the drive belt is in abutment with the clamping apparatus and with the belt pulley which is connected to the rotor for conjoint rotation therewith;
the belt pulley is non-toothed; and
the belt pulley is driven by the non-toothed side of the drive belt through a frictional engagement between the belt pulley and the non-toothed side of the drive belt, such that the belt pulley is configured to be driven by the drive device, braked by the drive device, or driven by the drive device and braked by the drive device.

2. The revolving door according to claim 1 further comprising a retention apparatus that is configured to have a non-variable distance relative to the central axis of the rotor, wherein at least one force storage apparatus resiliently couples the clamping apparatus to the retention apparatus.

3. The revolving door according to claim 1, wherein:
the clamping apparatus comprises an input redirection roller and an output redirection roller; and
at least one of the input redirection roller and the output redirection roller is moveable with respect to the central axis of the rotor.

4. The revolving door according to claim 3, wherein:
the input redirection roller is supported by a first force storage apparatus so as to be moveable with respect to the central axis of the rotor, the first force storage apparatus being secured to a retention apparatus which is non-moveable with respect to the central axis of the rotor;
the output redirection roller is supported by a second force storage apparatus so as to be moveable with respect to the central axis of the rotor, the second force storage apparatus being secured to the retention apparatus; and
the drive apparatus is supported so as to be non-moveable with respect to the central axis of the rotor.

5. The revolving door according to claim 4, wherein the first force storage apparatus comprises a first tension spring apparatus or a first pressure spring apparatus, and the second force storage apparatus comprises a second tension spring apparatus or a second pressure spring apparatus.

6. The revolving door according to claim 3, further comprising a stop which limits a spacing of the output redirection roller with respect to the central axis of the rotor.

7. The revolving door according to claim 3, wherein:
when the rotor is accelerated by the drive device, a spacing of the input redirection roller with respect to the central axis of the rotor is reduced and a spacing of the output redirection roller with respect to the central axis of the rotor is increased; and,
when the rotor is braked by the drive device, the spacing of the input redirection roller with respect to the central axis of the rotor is increased.

8. The revolving door according to claim 7, wherein when the rotor is braked by the drive device, the output redirection roller is spaced at a predetermined spacing with respect to the central axis of the rotor.

* * * * *